(12) United States Patent
Hunnicutt

(10) Patent No.: US 8,387,659 B2
(45) Date of Patent: Mar. 5, 2013

(54) PILOT OPERATED SPOOL VALVE

(75) Inventor: Harry A. Hunnicutt, Austin, TX (US)

(73) Assignee: DunAn Microstaq, Inc., Austin, TX (US)

(*) Notice: Subject to any disclaimer, the term of this patent is extended or adjusted under 35 U.S.C. 154(b) by 796 days.

(21) Appl. No.: 12/593,701

(22) PCT Filed: Mar. 28, 2008

(86) PCT No.: PCT/US2008/004134
§ 371 (c)(1),
(2), (4) Date: Sep. 29, 2009

(87) PCT Pub. No.: WO2008/121365
PCT Pub. Date: Oct. 9, 2008

(65) Prior Publication Data
US 2010/0084031 A1 Apr. 8, 2010

Related U.S. Application Data

(60) Provisional application No. 60/921,105, filed on Mar. 31, 2007.

(51) Int. Cl.
*F16K 11/07* (2006.01)
*F16K 31/383* (2006.01)
*F16K 31/40* (2006.01)

(52) U.S. Cl. .................... 137/625.35; 251/25; 251/26

(58) Field of Classification Search ............. 137/625.34, 137/1; 251/25, 26
See application file for complete search history.

(56) References Cited

U.S. PATENT DOCUMENTS

| | | | |
|---|---|---|---|
| 668,202 A | 2/1901 | Nethery | |
| 886,045 A | 4/1908 | Ehrlich et al. | |
| 1,886,205 A | 11/1932 | Lyford | |
| 1,926,031 A | 9/1933 | Boynton | |
| 2,412,205 A | 12/1946 | Cook | |
| 2,504,055 A | 4/1950 | Thomas | |
| 2,585,556 A * | 2/1952 | Johnson, Jr. | 251/26 |
| 2,651,325 A | 9/1953 | Lusignan | |
| 2,836,198 A * | 5/1958 | McNeill | 137/625.35 |
| 2,840,107 A | 6/1958 | Campbell | |
| 2,875,779 A | 3/1959 | Campbell | |
| 3,031,747 A | 5/1962 | Green | |
| 3,729,807 A | 5/1973 | Fujiwara | |
| 3,747,628 A | 7/1973 | Holster et al. | |
| 3,860,949 A | 1/1975 | Stoeckert et al. | |
| 4,005,454 A | 1/1977 | Froloff et al. | |
| 4,019,388 A | 4/1977 | Hall, II et al. | |
| 4,023,725 A | 5/1977 | Ivett et al. | |
| 4,100,236 A | 7/1978 | Gordon et al. | |
| 4,152,540 A | 5/1979 | Duncan et al. | |

(Continued)

FOREIGN PATENT DOCUMENTS

| CN | 200880014057.X | 7/2010 |
|---|---|---|
| CN | 101617155 B | 3/2012 |

(Continued)

OTHER PUBLICATIONS

International Search Report dated Apr. 5, 2010 for Application No. PCT/US2009/05355.

(Continued)

*Primary Examiner* — John Rivell
(74) *Attorney, Agent, or Firm* — MacMillan, Sobanski & Todd, LLC

(57) ABSTRACT

A spool valve assembly includes a spool that is moveable by differential pressure across the spool.

30 Claims, 13 Drawing Sheets

U.S. PATENT DOCUMENTS

| | | |
|---|---|---|
| 4,181,249 A | 1/1980 | Peterson et al. |
| 4,298,023 A | 11/1981 | McGinnis |
| 4,341,816 A | 7/1982 | Lauterbach et al. |
| 4,354,527 A | 10/1982 | McMillan |
| 4,434,813 A | 3/1984 | Mon |
| 4,476,893 A | 10/1984 | Schwelm |
| 4,543,875 A | 10/1985 | Imhof |
| 4,581,624 A | 4/1986 | O'Connor |
| 4,593,719 A | 6/1986 | Leonard |
| 4,628,576 A | 12/1986 | Giachino et al. |
| 4,647,013 A | 3/1987 | Giachino et al. |
| 4,661,835 A | 4/1987 | Gademann et al. |
| 4,772,935 A | 9/1988 | Lawler et al. |
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,869,282 A | 9/1989 | Sittler et al. |
| 4,938,742 A | 7/1990 | Smits |
| 4,943,032 A | 7/1990 | Zdeblick |
| 4,946,350 A | 8/1990 | Suzuki et al. |
| 4,959,581 A | 9/1990 | Dantlgraber |
| 4,966,646 A | 10/1990 | Zdeblick |
| 5,029,805 A | 7/1991 | Albarda et al. |
| 5,037,778 A | 8/1991 | Stark et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,066,533 A | 11/1991 | America et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,116,457 A | 5/1992 | Jerman |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,169,472 A | 12/1992 | Goebel |
| 5,176,358 A | 1/1993 | Bonne et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,215,244 A | 6/1993 | Buchholz et al. |
| 5,216,273 A | 6/1993 | Doering et al. |
| 5,217,283 A | 6/1993 | Watanabe |
| 5,222,521 A | 6/1993 | Kihlberg |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,323,999 A | 6/1994 | Bonne et al. |
| 5,325,880 A | 7/1994 | Johnson et al. |
| 5,333,831 A | 8/1994 | Barth et al. |
| 5,336,062 A | 8/1994 | Richter |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,543,349 A | 8/1996 | Kurtz et al. |
| 5,553,790 A | 9/1996 | Findler et al. |
| 5,566,703 A | 10/1996 | Watanabe et al. |
| 5,577,533 A | 11/1996 | Cook, Jr. |
| 5,589,422 A | 12/1996 | Bhat |
| 5,611,214 A | 3/1997 | Wegeng et al. |
| 5,785,295 A | 7/1998 | Tsai |
| 5,810,325 A | 9/1998 | Carr |
| 5,838,351 A | 11/1998 | Weber |
| 5,848,605 A | 12/1998 | Bailey et al. |
| 5,856,705 A | 1/1999 | Ting |
| 5,873,385 A | 2/1999 | Bloom et al. |
| 5,909,078 A | 6/1999 | Wood et al. |
| 5,926,955 A | 7/1999 | Kober |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,041,650 A | 3/2000 | Swindler et al. |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Takahashi et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,283,441 B1 | 9/2001 | Tian |
| 6,386,507 B2 | 5/2002 | Dhuler et al. |
| 6,390,782 B1 | 5/2002 | Booth et al. |
| 6,494,804 B1 | 12/2002 | Hunnicutt et al. |
| 6,505,811 B1 | 1/2003 | Barron et al. |
| 6,520,197 B2 | 2/2003 | Deshmukh et al. |
| 6,523,560 B1 | 2/2003 | Williams et al. |
| 6,533,366 B1 | 3/2003 | Fuller et al. |
| 6,540,203 B1 | 4/2003 | Hunnicutt |
| 6,581,640 B1 | 6/2003 | Barron |
| 6,637,722 B2 | 10/2003 | Hunnicutt |
| 6,662,581 B2 | 12/2003 | Hirota et al. |
| 6,694,998 B1 | 2/2004 | Hunnicutt |
| 6,724,718 B1 | 4/2004 | Shinohara et al. |
| 6,761,420 B2 | 7/2004 | Maluf et al. |
| 6,845,962 B1 | 1/2005 | Barron et al. |
| 6,872,902 B2 | 3/2005 | Cohn et al. |
| 6,902,988 B2 | 6/2005 | Barge et al. |
| 6,958,255 B2 | 10/2005 | Khuri-Yakub et al. |
| 6,966,329 B2 | 11/2005 | Liberfarb |
| 7,011,378 B2 | 3/2006 | Maluf et al. |
| 7,063,100 B2 | 6/2006 | Liberfarb |
| 7,210,502 B2 | 5/2007 | Fuller et |
| 7,372,074 B2 | 5/2008 | Milne et al. |
| 7,449,413 B1 | 11/2008 | Achuthan et al. |
| 8,113,448 B2 | 2/2012 | Keating |
| 8,113,482 B2 | 2/2012 | Hunnicutt |
| 8,156,962 B2 | 4/2012 | Luckevich |
| 2002/0014106 A1 | 2/2002 | Srinivasan et al. |
| 2002/0029814 A1 | 3/2002 | Unger et al. |
| 2002/0096421 A1 | 7/2002 | Cohn et al. |
| 2002/0174891 A1 | 11/2002 | Maluf et al. |
| 2003/0061889 A1 | 4/2003 | Tadigadapa et al. |
| 2003/0092526 A1 | 5/2003 | Hunnicutt et al. |
| 2003/0098612 A1 | 5/2003 | Maluf et al. |
| 2003/0159811 A1 | 8/2003 | Nurmi |
| 2003/0206832 A1 | 11/2003 | Thiebaud et al. |
| 2004/0115905 A1 | 6/2004 | Barge et al. |
| 2005/0121090 A1 | 6/2005 | Hunnicutt |
| 2005/0200001 A1 | 9/2005 | Joshi et al. |
| 2005/0205136 A1 | 9/2005 | Freeman |
| 2006/0017125 A1 | 1/2006 | Lee et al. |
| 2006/0067649 A1 | 3/2006 | Tung et al. |
| 2006/0218953 A1 | 10/2006 | Hirota |
| 2007/0251586 A1 | 11/2007 | Fuller et al. |
| 2007/0289941 A1 | 12/2007 | Davies |
| 2008/0035224 A1* | 2/2008 | Tyer ................ 137/625.34 |
| 2008/0072977 A1 | 3/2008 | George et al. |
| 2009/0123300 A1 | 5/2009 | Uibel |
| 2009/0186466 A1 | 7/2009 | Brewer |
| 2010/0019177 A1 | 1/2010 | Luckevich |

| | | |
|---|---|---|
| 2010/0038576 A1 | 2/2010 | Hunnicutt |
| 2010/0225708 A1 | 9/2010 | Peng et al. |
| 2012/0000550 A1 | 1/2012 | Hunnicutt |

FOREIGN PATENT DOCUMENTS

| | | |
|---|---|---|
| DE | 2215526 | 10/1973 |
| DE | 2930779 | 2/1980 |
| DE | 3401404 | 7/1985 |
| DE | 4101575 | 7/1992 |
| DE | 4417251 | 11/1995 |
| DE | 4422942 | 1/1996 |
| EP | 250948 | 1/1988 |
| EP | 261972 | 3/1988 |
| EP | 1024285 | 8/2000 |
| GB | 2238267 | 5/1991 |
| JP | Sho 39-990 | 2/1964 |
| JP | 04-000003 | 1/1992 |
| JP | 06-117414 | 4/1994 |
| JP | 2001184125 | 7/2001 |
| JP | 2003-049933 | 2/2003 |
| JP | 2006-080194 | 3/2006 |
| WO | WO99/16096 | 4/1999 |
| WO | WO99/24783 | 5/1999 |
| WO | WO00/14415 | 3/2000 |
| WO | 00/14415 A3 | 7/2000 |
| WO | WO2005/084211 | 9/2005 |
| WO | 2005/084211 A3 | 1/2006 |
| WO | 2006/076386 A1 | 7/2006 |
| WO | 2008/076388 A1 | 6/2008 |
| WO | 2008/076388 B1 | 8/2008 |
| WO | 2008/121369 A1 | 10/2008 |
| WO | 2010/019329 A2 | 2/2010 |
| WO | 2010/019329 A3 | 2/2010 |
| WO | 2010/019665 A2 | 2/2010 |
| WO | 2010/019665 A3 | 2/2010 |
| WO | 2010/065804 A2 | 6/2010 |
| WO | 2010/065804 A3 | 6/2010 |
| WO | 2011/022267 A2 | 2/2011 |
| WO | 2011/022267 A3 | 2/2011 |
| WO | 2011/094300 A2 | 8/2011 |
| WO | 2011/094300 A3 | 8/2011 |
| WO | 2011/094302 A2 | 8/2011 |
| WO | 2011/094302 A3 | 8/2011 |

OTHER PUBLICATIONS

Booth, Steve and Kaina, Rachid, Fluid Handling—Big Gains from Tiny,Valve, Appliance Design (Apr. 2008), pp. 46-48.
Controls Overview for Microstaq Silicon Expansion Valve (SEV), Rev. 1, Dec. 2008, http://www.microstaq.com/pdf/SEV_controls.pdf, accessed May 17, 2010.
Copeland, Michael V., Electronic valves promise big energy savings, Fortune (Sep. 9, 2008), http://techland.blogs.fortune.cnn.com/2008/09/09/electronic-valves-promise-big-energy-savings, accessed Sep. 9, 2008.
Higginbotham, Stacey, Microstaq's Tiny Valves Mean Big Energy Savings, http//earth2tech.com/2008/09/09/microstaqs-tiny-valves-mean-big-energy savings (posted Dec. 8, 2008), accessed Sep. 9, 2008.
Keefe, Bob, Texas firm says value-replacing chip can drastically cut energy use, Atlanta Metro News (Sep. 10, 2008), http://www.ajc.com/search/content/shared/money/stories/2008/09/microstaq10_cox-F9782.html, accessed Sep. 10, 2008.
Luckevich, Mark, MEMS microvlaves: the new valve world, Valve World (May 2007), pp. 79-83.
MEMS, Microfluidics and Microsystems Executive Review, http:www.memsinvestorjournal.com/2009/04/mems-applications-for-flow-control-.html, accessed May 17, 2010.
Microstaq Announces High Volume Production of MEMS-Based Silicon Expansion Valve, http://www.earthtimes.org/articles/printpressstory.php?news+1138955 (posted Jan. 27, 2010), accessed Jan. 27, 2010.
Microstaq Product Description, Proportional Direct Acting Silicon Control Valve (PDA-3), http://www.microstaq.com/products/pda3.html, accessed May 17, 2010.
Microstaq Product Description, Proportional Piloted Silicon Control Valve (CPS-4), http://www.microstaq.com/products/cps4.html, accessed May 17, 2010.
Microstaq Product Descriptions, SEV, CPS-4, and PDA-3, http://www.microstaq.com/products/index.html, accessed May 17, 2010.
Microstaq Technology Page, http://www.microstaq.com/technology/index.html, accessed May 17, 2010.
Press Release, Freescale and Microstaq Join Forces on Smart Superheat Control System for HVAC and Refrigeration Efficiency, http://www.microstaq.com/pressReleases/prDetail_04.html (posted Jan. 22, 2008), accessed May 17, 2010.
Press Release, Microstaq Mastering Electronic Controls for Fluid-Control Industry, http://www.microstaq.com/pressReleases/prDetail_02.html (posted May 5, 2005), accessed May 17, 2010.
Press Release, Microstaq Unveils Revolutionary Silicon Expansion Valve at Demo 2008, http://www.microstaq.com/pressReleases/prDetail_05.html (posted Sep. 8, 2008), accessed May 17, 2010.
Press Release, Nanotechnology Partnerships, Connections Spur Innovation for Fluid Control Industries, http://www.microstaq.com/pressReleases/prDetail_03.html (posted Jun. 9, 2005), accessed May 17, 2010.
Product Review, greentechZONE Products for the week of May 18, 2009, http://www.en-genius.net/site/zones/greentechZONE/product_reviews/grnp_051809, accessed May 17, 2010.
SEV Installation Instructions, http://www.microstaq.com/pdf/SEV_Instruction_sheet.pdf, accessed May 17, 2010.
Silicon Expansion Valve (SEV)—for Heating, Cooling, and Refrigeration Applications, http://www.microstaq.com/pdf/SEV_Quicksheet.pdf, accessed May 17, 2010.
Silicon Expansion Valve Data Sheet, http://www.microstaq.com/pdf/SEV_Datasheet_1_8.pdf, accessed May 17, 2010.
Silicon Expansion Valve Information Sheet, http://www.microstaq.com/pdf/SEV_Infosheet_2_0.pdf, accessed May 17, 2010.
SMIC Announces Successful Qualification of a MEMS Chip for Microstaq, http://www.prnewswire.com/news-releases/smic-announces-successful-qualification-of-a-mems-chip-for-microstaq-65968252.html (posted Oct. 26, 2009), accessed May 17, 2010.
SMIC quals Microstaq MEMS chip for fluid control, http://www.electroiq.com/ElectroiQ/en-us/index/display/Nanotech_Article_Tools_Template.articles.small-times.nanotechmems.mems.microfluidics.2009.10.smic-quals_microstaq.html, (posted Oct. 26,2009), acc.
Tiny Silicon Chip Developed by Microstaq Will Revolutionize Car Technology, http://www.nsti.org/press/PRshow.html?id=160 (posted May 19, 2005), accessed May 19, 2005.
Turpin, Joanna R., Soft Economy, Energy Prices Spur Interest in Technologies, http://www.achrnews.com/copyright/BNP_GUID_9-5-2006_A_10000000000000483182, accessed May 18, 2010.
Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.
Chinese Office Action, Application No. 200880014037.2 dated Sep. 13, 2010, [55-28960/AM0014].
Chinese Office Action (Response), Application No. 200880014037.2 dated Mar. 30, 2011, [55-28960/AM0014].
Chinese Office Action (Second plus translation), Application No. 200880014037.2 dated Sep. 26, 2012, [55-28960/AM0014].
"A Silicon Microvalve for the Proportional Control of Fluids" by K.R. Williams, N.I. Maluf, E.N. Fuller, R.J. Barron, D. P. Jaeggi, and B.P. van Drieenhuizen, Transducers '99, Proc. 10th International Conference on Solid State Sensors and Actuators, held Jun. 7-10, 1999, Sendai, Japan, pp. 18-21.
"Process for in-plane and out-of-plane single-crystal-silicon thermal microactuators"; J. Mark Noworolski, et al.; Sensors and Actuators A 55 (1996); pp. 65-69.
Ayon et al., "Etching Characteristics and Profile Control in a Time Multiplexed ICP Etcher," Proc. Of Solid State Sensor and Actuator Workshop Technical Digest, Hilton Head SC, (Jun. 1998) 41-44.
Bartha et al., "Low Temperature Etching of Si in High Density Plasma Using SF6/02," Microelectronic Engineering, Elsevier Science B.V., vol. 27, (1995) 453-456.
Fung et al., "Deep Etching of Silicon Using Plasma" Proc. Of the Workshop on Micromachining and Micropackaging of Transducers, (Nov. 7-8, 1984) pp. 159-164.

IEEE Technical Digest entitled "Compliant Electra-thermal Microactuators", J. Jonsmann, O. Sigmund, S. Bouwstra, Twelfth IEEE International Conference on Micro Electro Mechanical Systems held Jan. 17-21, 1999, Orlando, Florida, pp. 588-593, IEEE Catalog Number: 99CH36291C.

Klaassen et al., "Silicon Fusion Bonding and Deep Reactive Ion Etching; A New Technology for Microstructures," Proc., Transducers 95 Stockholm Sweden, (1995) 556-559.

Linder et al., "Deep Dry Etching Techniques as a New IC Compatible Tool for Silicon Micromachining," Proc,. Transducers, vol. 91, (Jun. 1991) pp. 524-527.

Petersen et al. "Surfaced Micromachined Structures Fabricated with Silicon Fusion Bonding" Proc., Transducers 91, (Jun. 1992) pp. 397-399.

Yunkin et al., "Highly Anisotropic Selective Reactive Ion Etching of Deep Trenches in Silicon," Microelectronic Engineering, Elsevier Science B.V., vol. 23, (1994) pp. 373-376.

Biography, Ohio State University Website [online], [retrieved Dec. 31, 2000]. Retrieved from the Internet <URL: http://www.chemistry.ohio-state.edu/resource/pubs/brochure/madou.htm>.

Madou, Marc, "Fundamentals of Microfabrication", Boca Raton: CRC Press, 1997, 405-406.

Chinese Office Action, Application No. 200880014057.X dated Jul. 14, 2010.

Substitute Claims filed in Chinese Application No. 200880014057.X dated Jul. 14, 2010.

Gui, C. et al, "Selective Wafer Bonding by Surface Roughness Control", Journal of the Electrochemical Society, 148 (4) G225-G228 (2001).

Gui, C. et al., "Fusion bonding of rough surfaces with polishing technique for silicon micromachining", Microsystem Technologies (1997) 122-128.

Zhixiong Liu et al., "Micromechanism fabrication using silicon fusion bonding", Robotics and Computer Integrated Manufacturing 17 (2001) 131-137.

Günther, Götz, "Entwicklung eines pneumatischen 3/2-Wege-Mikroventils", O + P Olhydraulik und Pneumatik, Vereinigte Fachverlage, Mainz, DE, vol. 42, No. 6, Jun. 1, 1998, pp. 396-398, XP000831050, ISSN: 0341-2660.

* cited by examiner

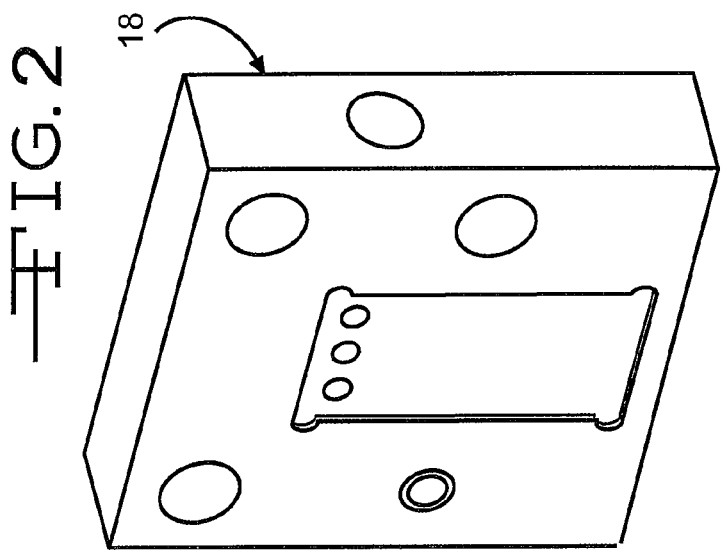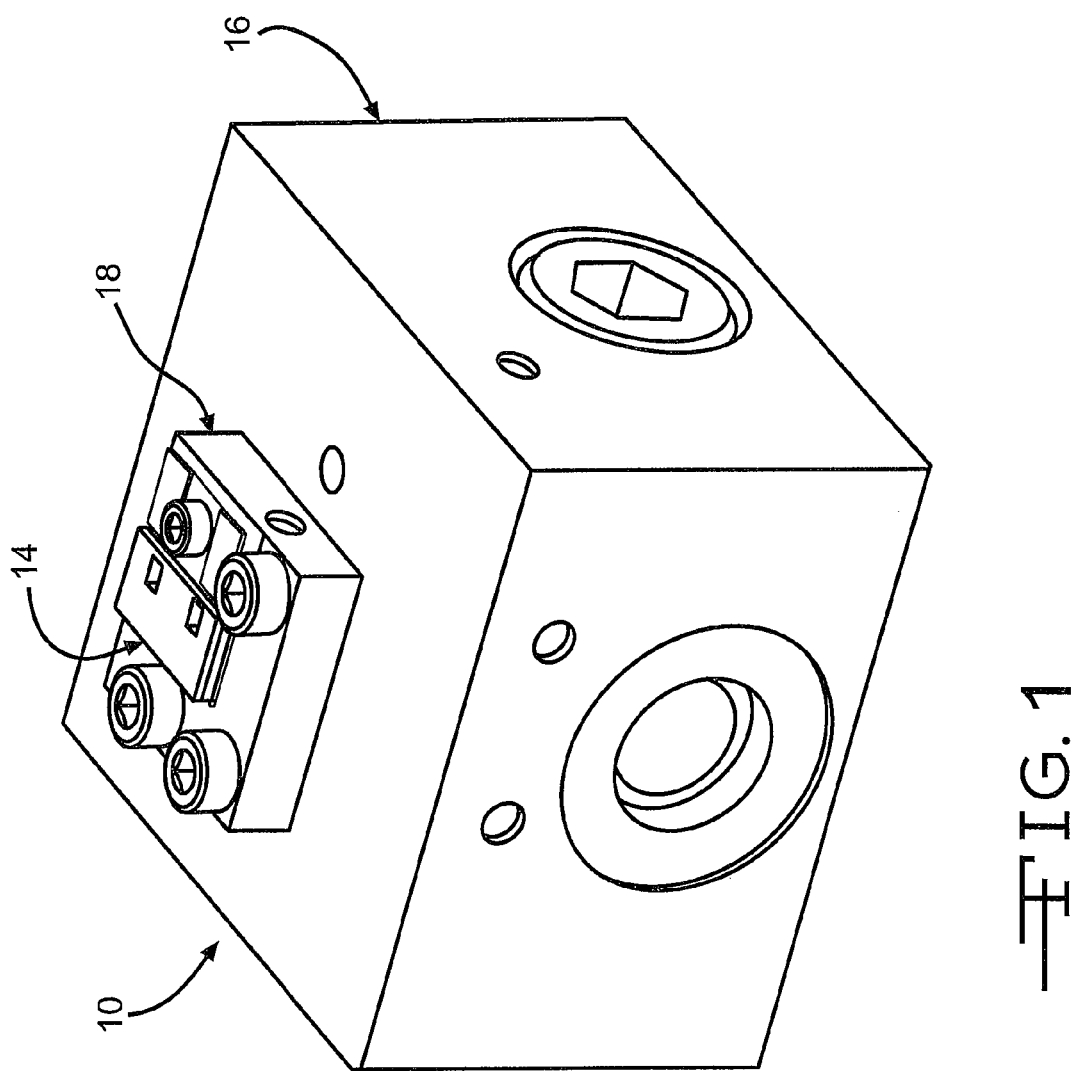

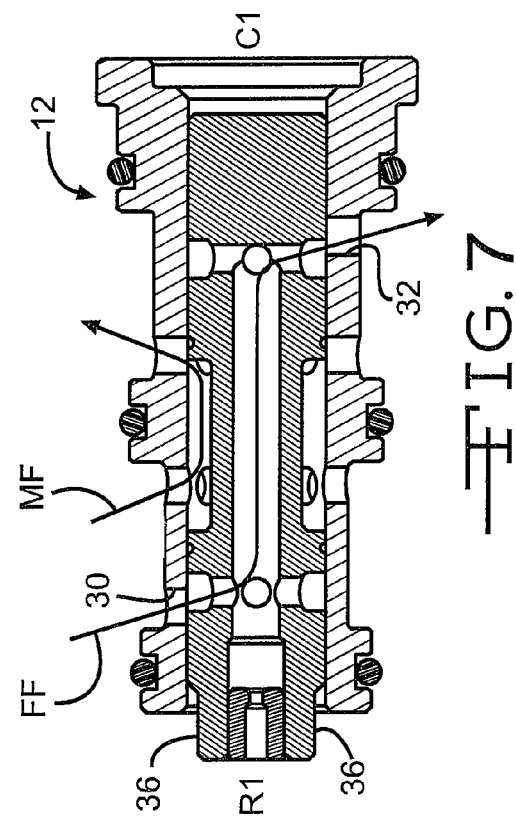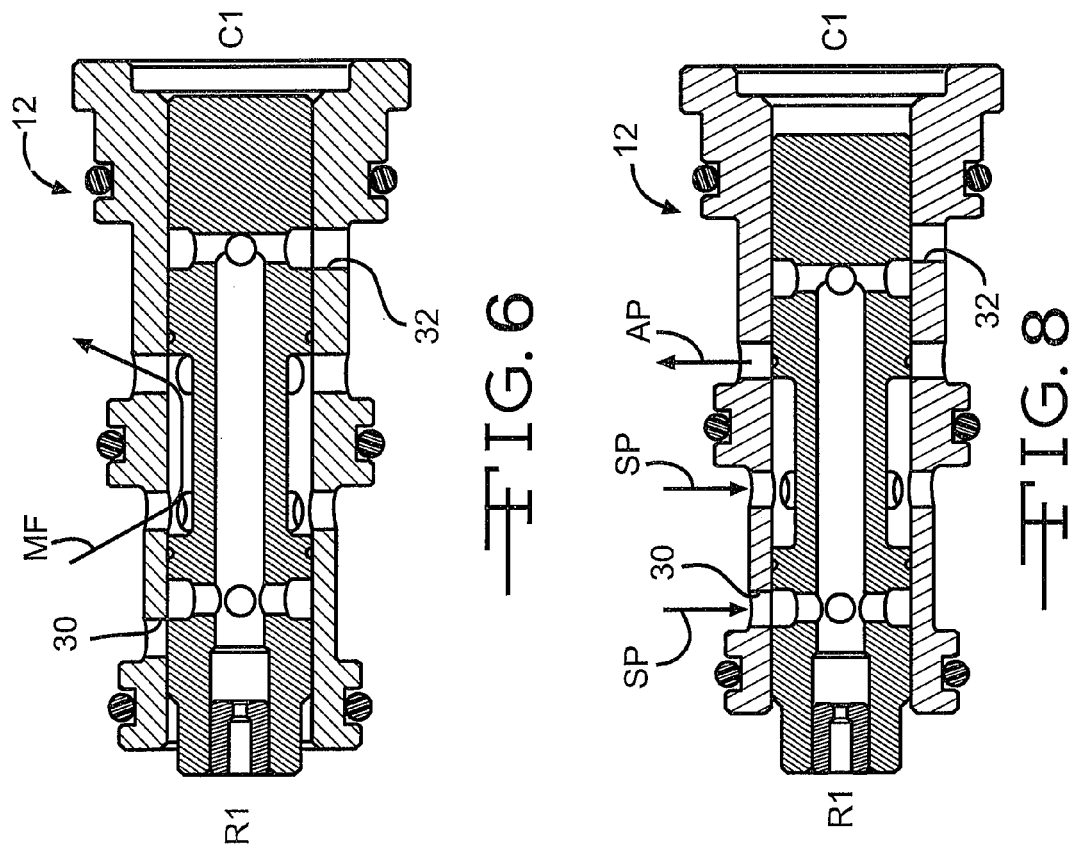

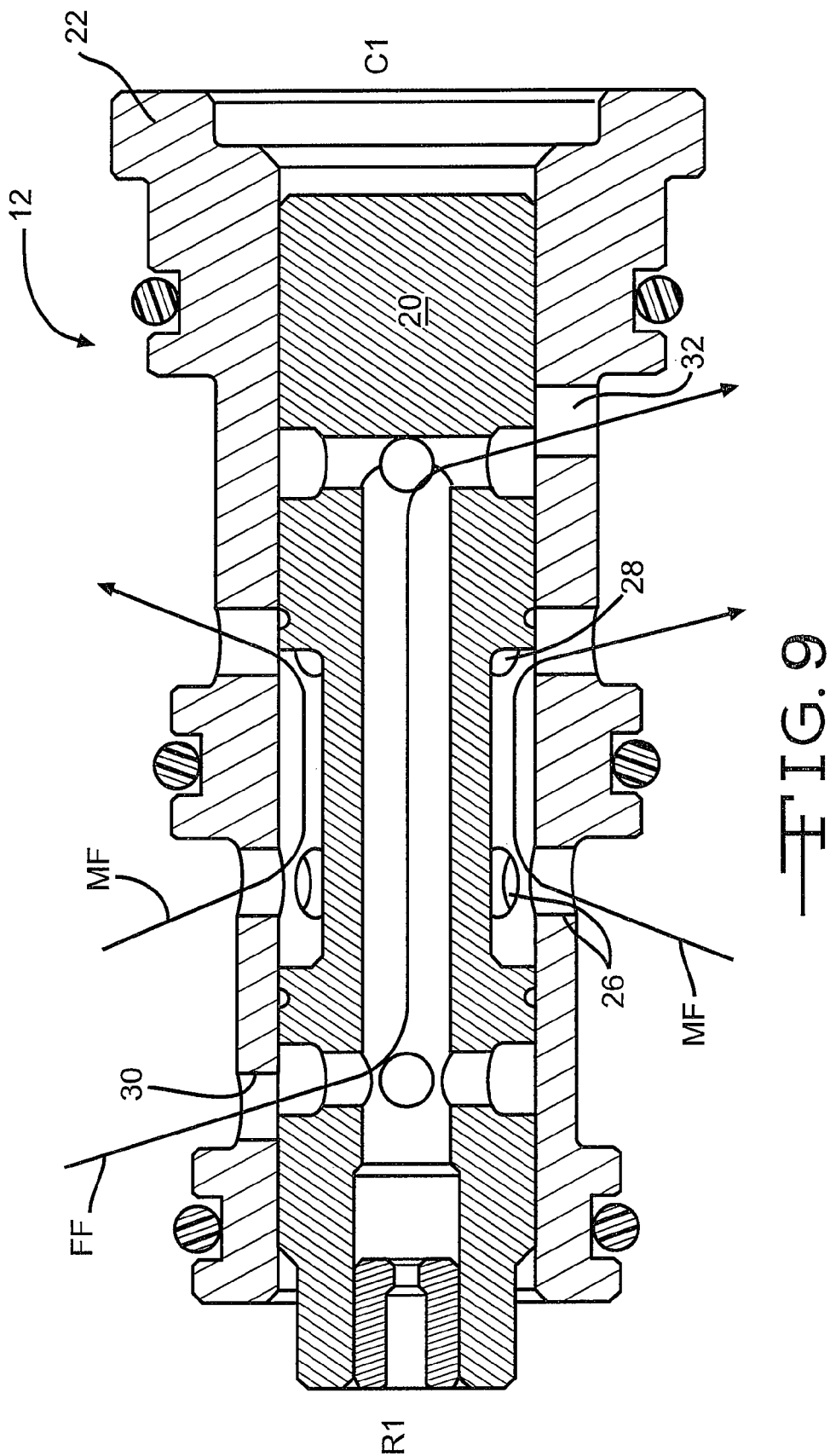

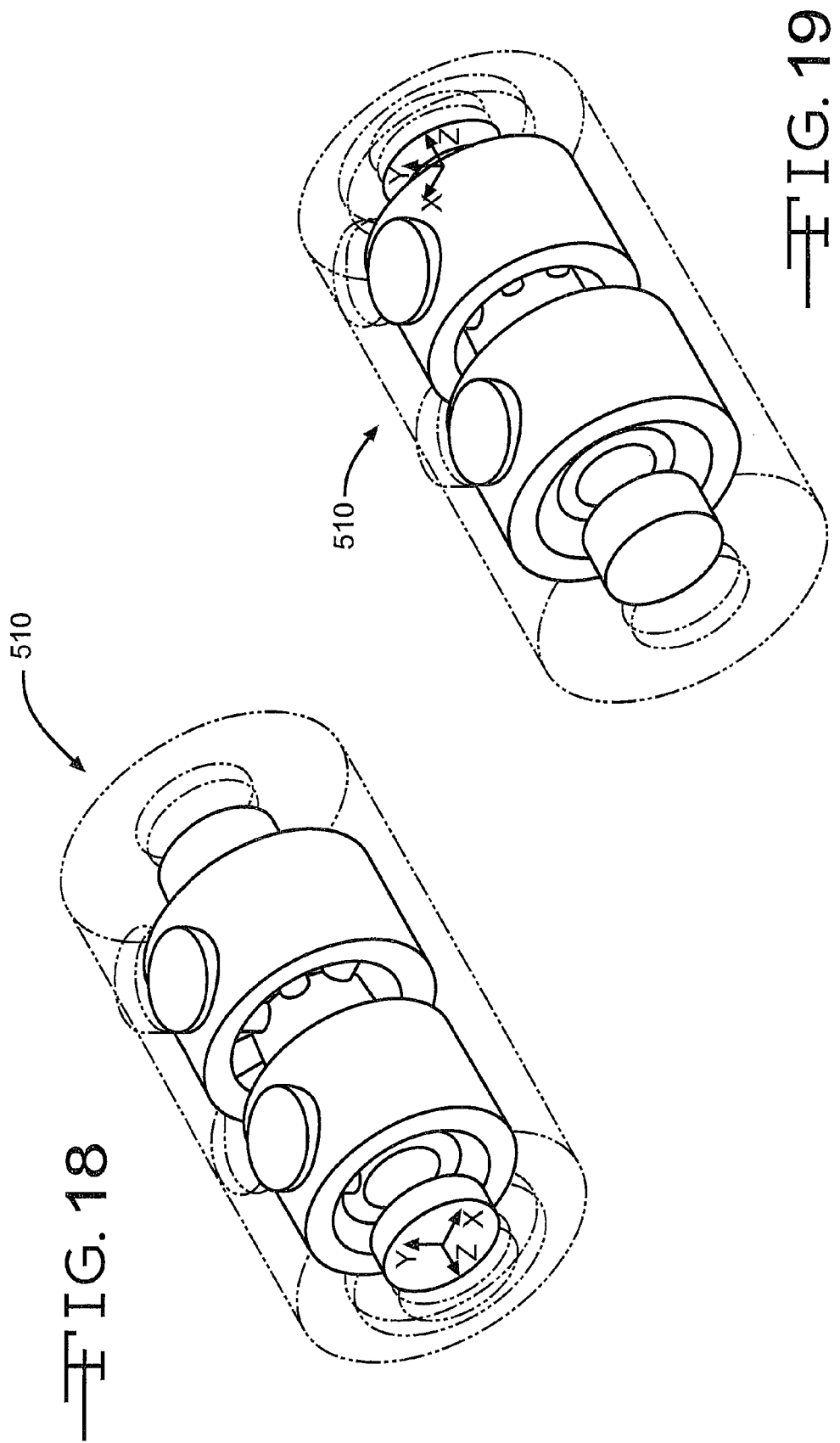

PILOT OPERATED SPOOL VALVE

CROSS-REFERENCE TO RELATED APPLICATIONS

This application is the National Stage of co-pending international application PCT/US2008/004134, filed 28 Mar. 2008, which claimed priority to US Provisional Patent Application No. 60/921,105, filed 31 Mar. 2007, the disclosures of both of which are incorporated herein by reference.

BACKGROUND OF THE INVENTION

This invention relates in general to valves for controlling fluid flow in a hydraulic or pneumatic system. More particularly, this invention relates to an improved spool valve assembly.

Valves are widely used for controlling the flow of a fluid from a source of pressurized fluid to a load device or from a load device to a pressure vent. Frequently, a pump, or other device, is provided as the source of pressured fluid. The flow of the fluid is selectively controlled by a valve to control the operation of the load device.

One type of valve is a microvalve. A microvalve system is a MicroElectroMechanical System (MEMS) relating in general to semiconductor electromechanical devices.

MEMS is a class of systems that are physically small, having features with sizes in the micrometer range. A MEMS device is a device that at least in part forms part of such a system. These systems have both electrical and mechanical components. The term "micromachining" is commonly understood to mean the production of three-dimensional structures and moving parts of MEMS devices.

MEMS originally used modified integrated circuit (computer chip) fabrication techniques (such as chemical etching) and materials (such as silicon semiconductor material) to micromachine these very small mechanical devices. Today there are many more micromachining techniques and materials available.

The term "microvalve", as used in this application, means a valve having features with sizes in the micrometer range, and thus by definition is at least partially formed by micromachining. The term "microvalve device", as used in this application, means a device that includes a microvalve, and that may include other components. It should be noted that if components other than a microvalve are included in the microvalve device, these other components may be micromachined components or standard (macro) sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

One type of microvalve is the micro spool valve. The micro spool valve typically consists of a main valve body disposed in a chamber formed in an intermediate layer of multilayer valve housing. A variety of ports through the layers of the housing provide fluid communication with the chamber. The main valve body is moveable in the chamber to selectively allow fluid communication though the chamber by blocking particular ports depending on the desired result. In operation, a differential pressure is exerted across the main valve body to move the main valve body into a desired position. Typically, the differential pressure is controlled by a pilot valve.

Another type of microvalve, often used as a pilot valve, consists of a beam resiliently supported by the body at one end. In operation, an actuator forces the beam to bend about the supported end of the beam. In order to bend the beam, the actuator must generate a force sufficient to overcome the spring force associated with the beam. As a general rule, the output force required by the actuator to bend or displace the beam increases as the displacement requirement of the beam increases.

In addition to generating a force sufficient to overcome the spring force associated with the beam, the actuator must generate a force capable of overcoming the fluid flow forces acting on the beam that oppose the intended displacement of the beam. These fluid flow forces generally increase as the flow rate through the fluid ports increases.

As such, the output force requirement of the actuator and in turn the size of the actuator and the power required to drive the actuator generally must increase as the displacement requirement of the beam increases and/or as the flow rate requirement through the fluid ports increases.

One specific type of microvalve system is the pilot operated microvalve. Typically, such a microvalve device includes a micro spool valve that is pilot operated by a microvalve of the type as described above. For Example, U.S. Pat. Nos. 6,494,804, 6,540,203, 6,637,722, 6,694,998, 6,755,761, 6,845,962, and 6,994,115 disclose pilot operated microvalves, the disclosures of which are herein incorporated by reference.

SUMMARY OF THE INVENTION

This invention relates to an improved spool valve arrangement for controlling fluid flow in a hydraulic or pneumatic system.

The spool valve assembly includes a pilot operated spool valve that is moveable by differential pressure across the valve. In one embodiment, the spool valve assembly includes a spool disposed in a chamber. A first volume of fluid at a control pressure is disposed between a first spool end and a first chamber end. A second volume of fluid at a reference pressure is disposed between a second spool end and a second chamber end. The reference pressure varies as the position of the spool valve varies, due to a concurrent throttling effect of the spool valve. In another embodiment, the spool valve assembly includes a micro pilot valve that sets a command pressure in response to which a spool of a main spool valve moves. A cross-sectional flow area of a port of the main spool valve changes in proportion to the actuation of the micro pilot valve.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a spool valve assembly according to a first embodiment of the present invention.

FIG. 2 is a perspective view from below of the mounting structure of FIG. 1.

FIG. 6 is a cross-sectional view of the main spool valve of FIG. 5 in a fully open position.

FIG. 7 is a cross-sectional view of the main spool valve of FIG. 5 in an intermediate position.

FIG. 8 is a cross-sectional view of the main spool valve of FIG. 5 in a fully closed position.

FIG. 9 is an enlarged cross-sectional view of FIG. 7.

FIG. 18 is a front perspective schematic view of the spool valve assembly of FIG. 17.

FIG. 19 is a back perspective schematic view of the spool valve assembly of FIG. 17.

DETAILED DESCRIPTION OF THE PREFERRED EMBODIMENT

There is shown in FIGS. 1 and 3-5 a spool valve assembly 10 according to a first embodiment of the present invention. Note that elements with similar structure and function through out all of the Figures are labeled with similar identifiers (reference numbers). The assembly 10 includes a macro-sized main spool valve 12 that is driven by a micro pilot valve 14. Although the assembly 10 has been described as including the macro-sized main spool valve 12 and the micro pilot valve 14, it must be understood that the assembly 10 may includes any main spool valve or pilot valve suitable for the application in which the assembly 10 is to be used. In operation, the main spool valve 12 follows the movement of the pilot valve 14. That is to say that a change in the open-closed position of the pilot valve 14 is match by a linearly equivalent change in the open-closed position of the spool valve 12. In the present example, a direct linear relationship, if the micro pilot valve 14 is half-open, the spool valve 12 will be half-open, etc. This is true regardless of pressure and flow conditions under which the assembly 10 is operating. The assembly 10 is preferably an electronically adjustable. As compared to other valve assemblies, the assembly 10 is preferably capable of handling high flows for it's size, and also preferably has a quick response.

Figure 4:
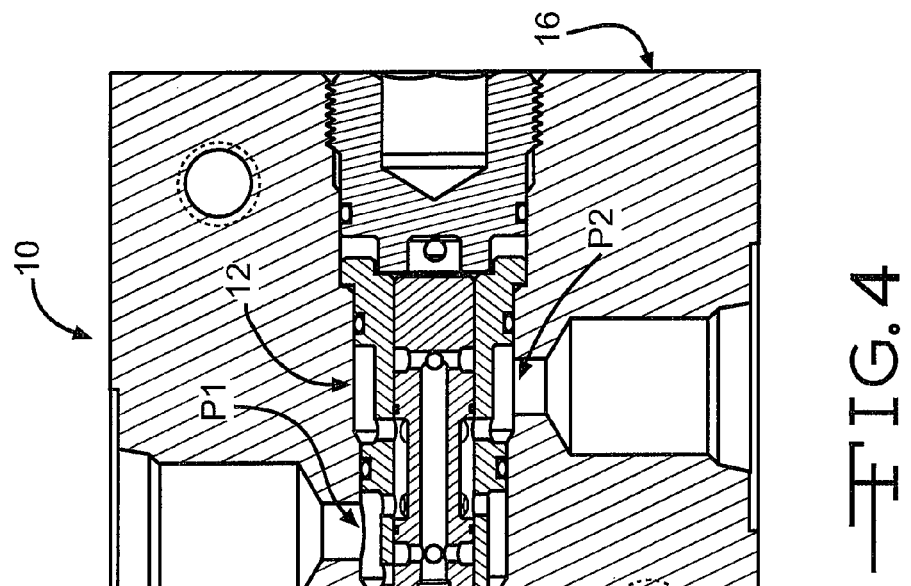
FIG. 4 is a cross-sectional view of the assembly of FIG. 3 taken along line 4-4.
Figure 3:
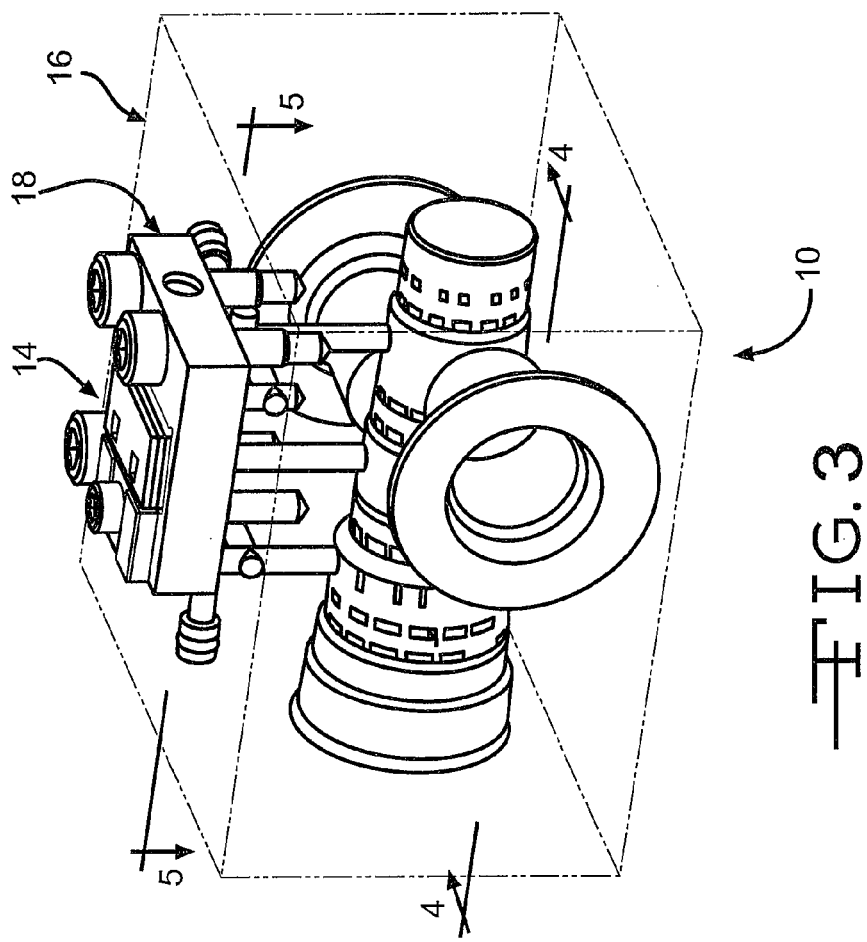
FIG. 3 is a semi-transparent perspective view of the assembly of FIG. 1.
Figure 5:
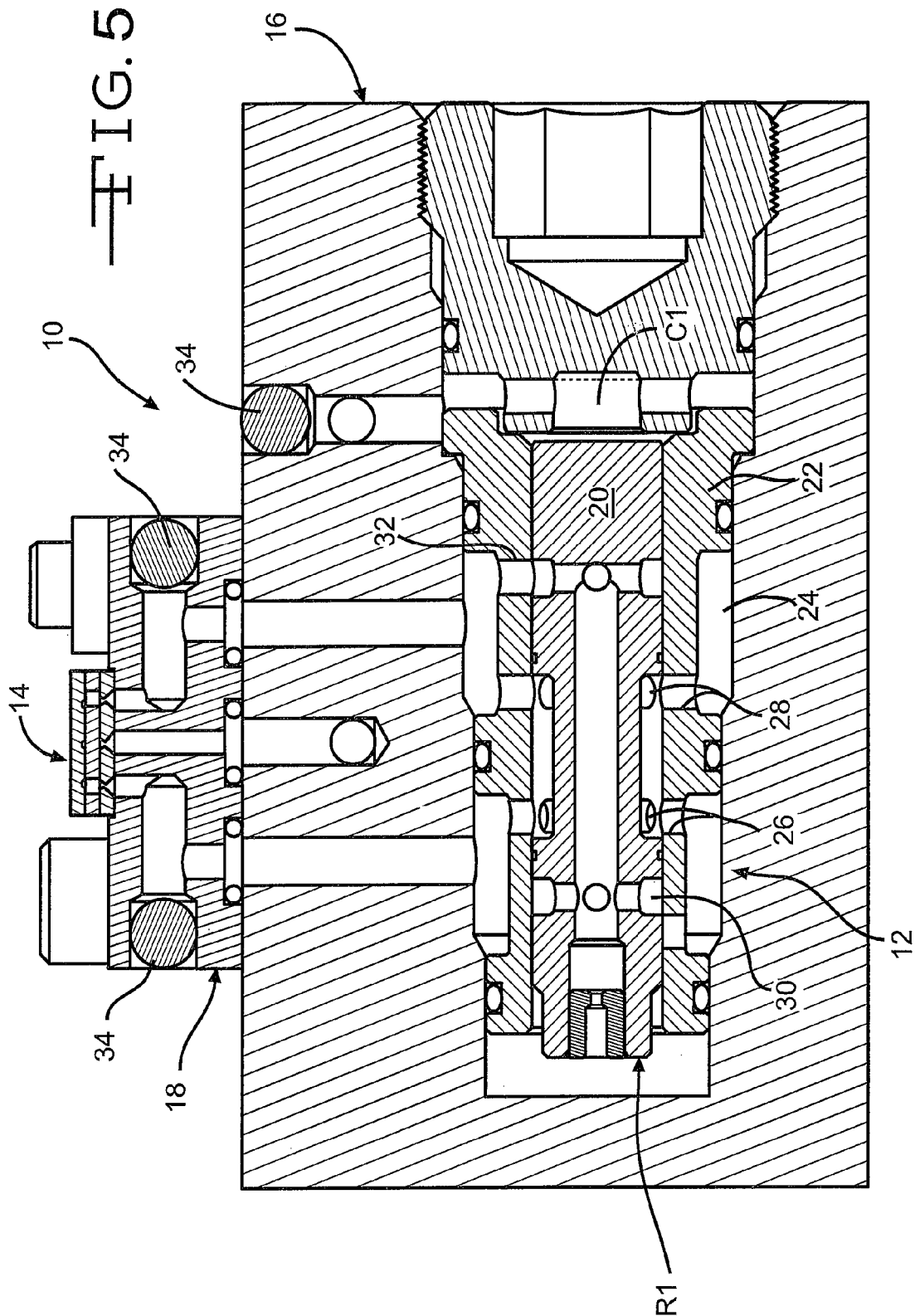
FIG. 5 is a cross-sectional view of the assembly of FIG. 3 taken along line 5-5.

The main spool valve 12 is a normally open valve. Although, it must be understood that the main spool valve 12 may be a normally closed, or otherwise normally positioned valve. The spool valve 12 is best shown in FIGS. 4 and 5 in a fully open position.

The main spool valve 12 is disposed in a block valve housing 16, although such is not required. The main spool valve 12 may be placed in any suitable environment.

The micro pilot valve 14 is secured to the valve housing 16 via a mounting structure 18, as best shown in FIG. 2, although such is not required. It must be understood that the pilot valve 14 may be suitably arranged anywhere in any manner in the assembly 10 as so desired.

The valve housing 16 includes a variety of passageways and port for connecting different portions of the device 10 to other portions of a fluid circuit or with each other.

As best shown in FIG. 5, the main spool valve 12 includes a spool 20 disposed within a sleeve 22 disposed with a chamber 24 formed in the valve housing 16. In one preferred embodiment, the spool 20 is a 6 mm diameter spool. The sleeve 22 includes a plurality of primary flow ports, including primary input ports 26 and primary output ports 28. As shown in FIG. 4, the primary flow enters the chamber 24 at P1 and exits the chamber 24 at P2. Referring again to FIG. 5, the pilot valve 14 will set a command pressure at C1 and in response, the spool 20 will move and set a corresponding reference pressure at R1. Preferably, the total stroke of the spool 20 is 1.0 mm, although such is not required. The sleeve 22 also includes at least one reference input port 30 and one reference output port 32. Most preferably, the reference input port 30 and the reference output port 32 two holes of 1.0 mm diameter. in series.

A plurality of optional ball check valves 34 are pressed into a series of passageways in the mount 18 and the housing 16 to provide additional flow control as desired.

In a preferred embodiment, the micro pilot valve 14 is an open center 3-way valve. The pilot valve 14 controls the command pressure on the spool 20 as indicated at C1. The spool 20 of the main spool valve 12 will move to a position that replicates the control pressure in the reference pressure on the end of the spool 20 as indicated at R1. This action modulates the open area of main flow of the spool valve 12 between the main input ports 26 and the main output ports 28.

There is shown in FIG. 6 the main spool valve 12 in a fully open position. In the case of a normally closed (closed in the unactuated state) pilot valve, this represents a power off example to the pilot valve. In this example, pressure from a supply source goes to the normally closed input port of the micro pilot valve 14. A lower pressure return is open to the output port of the micro spool valve 14. The pressure at C1 is the return pressure. The spool 20 is positioned toward the low pressure at C1 and the main spool valve 12 is fully open to main flow MF between the main input ports 26 and the main output ports 28. The input reference port 30 is closed to the reference pressure R1. The output reference port 32 is open to the reference pressure R1.

There is shown in FIG. 7 the main spool valve 12 in an intermediate position. In the present example, this represents a mid-power setting of the pilot valve. The pilot valve 14 is partially open giving an intermediate (to the supply and return) pressure in the command pressure C1. The main flow MF through the spool valve 12 is partially open. There is a feedback flow FF between the reference input port 30 and the reference output port 32 that sets the reference pressure R1. Preferably, the reference pressure R1 exists in the center of the spool 20 and in end grooves 36 of the spool 20.

FIG. 8 is a cross-sectional view of the main spool valve of FIG. 5 in a fully closed position. In the present example, this represents the pilot valve at full power: The pilot valve 14 is fully open to the source pressure generating maximum command pressure C1. The spool 20 of the main spool valve 12 is urged toward the reference pressure R1 and thus the main flow through the spool valve 12 is closed. The feedback flow is also closed only connecting the reference pressure R1 with the reference input port 30, resulting in supply pressure at the reference pressure R1.

The examples described with reference to FIGS. 6-8 are described with reference to a normally closed pilot valve with a normally open main spool valve. It must be understood, however, that a spool valve assembly according to the invention may include any desired combination of normally open, normally, closed or otherwise normally positioned valves.

It should be noted that in the preferred embodiment the command pressure C1 is essentially ported from the pilot valve 14 to the end of the spool 20 at the command pressure C1 to actuate movement of the spool 20. It must also be understood that in the preferred embodiment the feedback flow FF passes through the spool 20 to reduce leakage between the command pressure C1 and the reference pressure R1. This is useful in the replication of the movement of the spool 20 relative to the position of the pilot valve 14 and the power applied to the pilot valve 14.

There is shown in FIG. 9 an enlarged view of FIG. 7.

Figure 10:
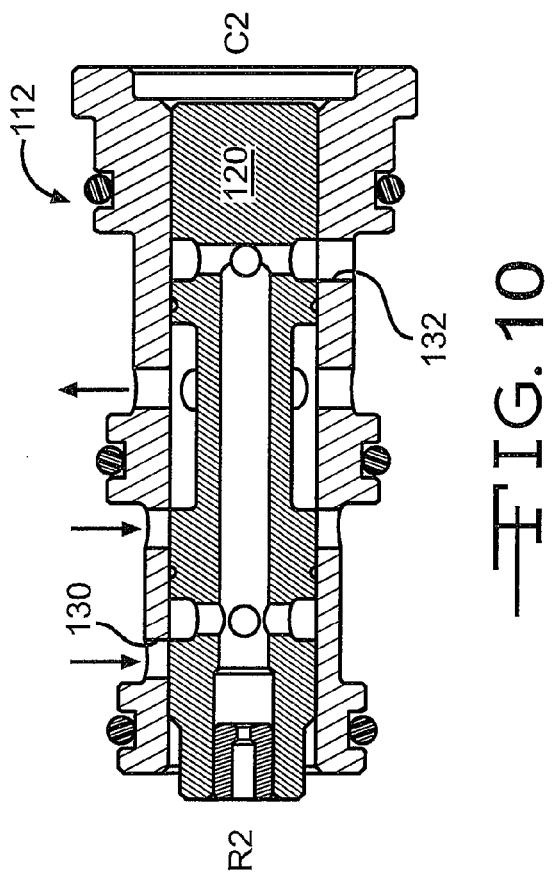
FIG. 10 a cross-sectional view of a main spool valve of a spool valve assembly according to a second embodiment of the present invention showing the main spool valve in a fully closed position.

There is shown in FIG. 10 a main spool valve 112 of a spool valve assembly according to a second embodiment of the present invention where the spool valve 112 is a normally closed valve and the pilot valve (not shown) is a normally closed valve. The main spool valve 112 is shown in FIG. 10 in a fully closed position. In this example, this case represents a power off state for the pilot valve. A pilot input port of the pilot valve is closed to a high pressure source while a pilot output port of the pilot valve is open to a low pressure return. A volume of fluid at control pressure C2 is in communication with the low pressure return via the pilot valve. A spool 120 of the spool valve 112 is drawn toward the volume at control pressure C2. Thus, the spool valve 112 is closed to a main flow. A feedback flow is closed between a reference input port 130 and a reference output port 132.

Figure 11:
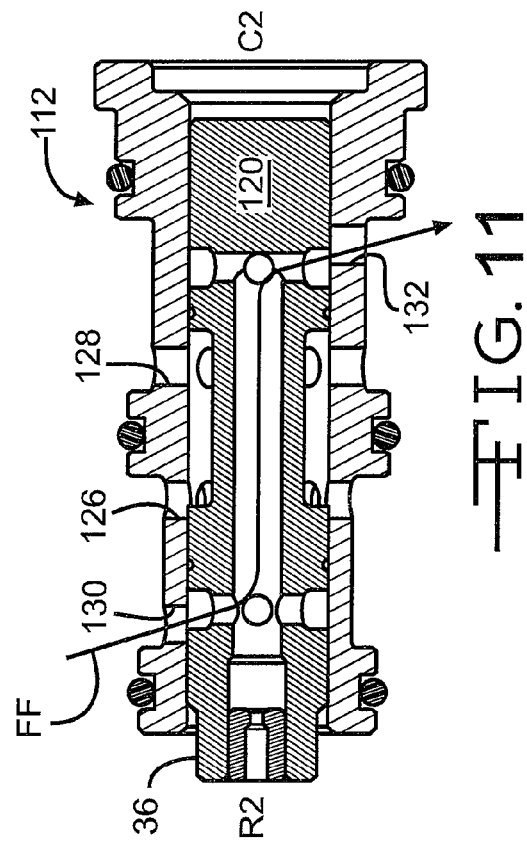
FIG. 11 is a cross-sectional view of the main spool valve of FIG. 10 in an intermediate position.

There is shown in FIG. 11 the main spool valve 112 in an intermediate position. In this example, this represents a mid power actuation for the pilot valve. The pilot input port will be partially open to the high pressure source and the pilot output port will be partially open to the low pressure return. Thus, the pilot valve provides an intermediate (to the supply pressure and return pressure) pressure command pressure C1 to the spool valve 112. The spool 120 is drawn toward a reference pressure R2. The spool valve 120 is partially open to the main flow MF between main input ports 126 and main out put ports 128. The spool valve 120 is partially open to the feedback flow FF.

Figure 12:
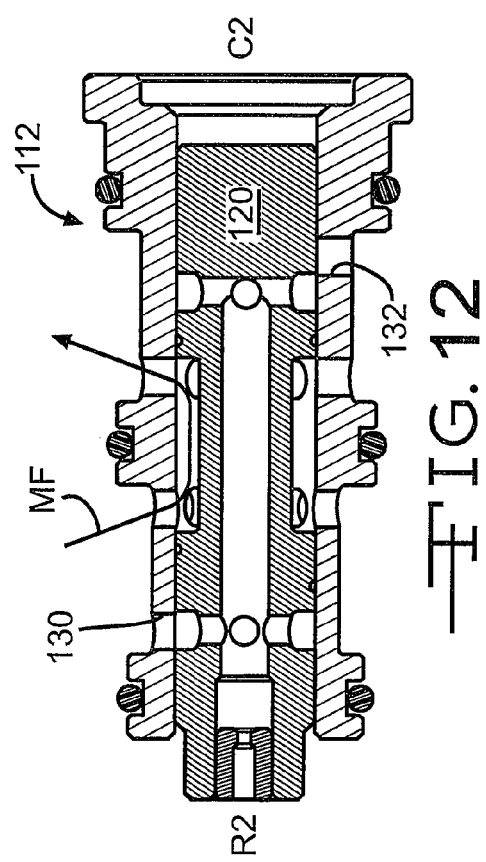
FIG. 12 is a cross-sectional view of the main spool valve of FIG. 10 in a fully open position.

There is shown in FIG. 12 the main spool valve 112 in a fully open position. In the present example, this case is a full power actuation of the pilot valve 114. The pilot input port is fully to the supply source and the pilot output port is fully closed to the low pressure return. Thus, the command pressure C2 is equal to the high pressure supply. The spool 120 is urged toward the reference pressure R2. The main flow is fully open. The reference pressure is in full communication with the high pressure supply source and fully closed to the low pressure return.

Preferably, in the present example, a pressurized volume of fluid exists within the spool 120 to reduce leakage between the command pressure C2 and the reference pressure R2. This is useful in replication of the pilot valve position by the main spool.

Figure 13:
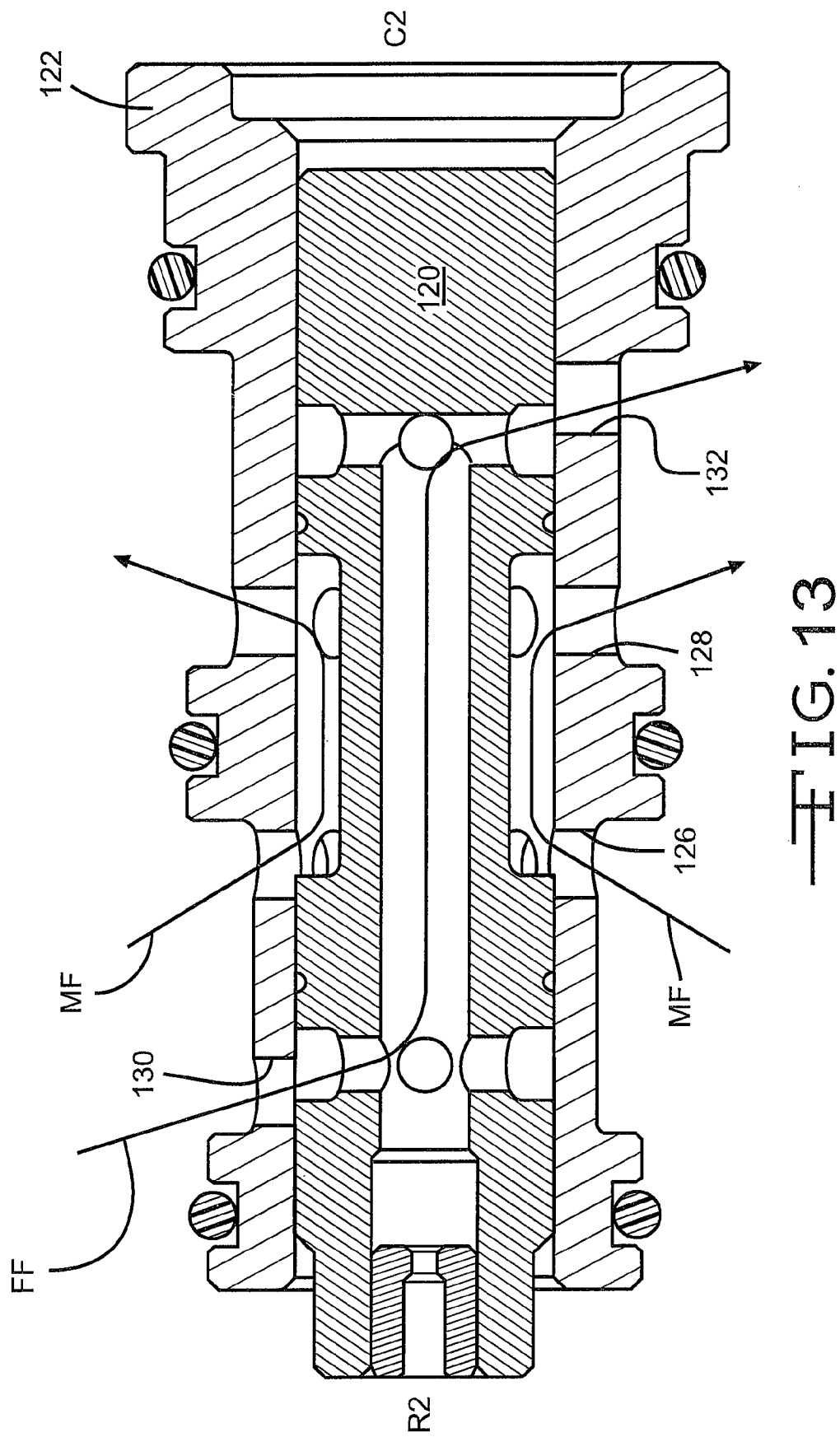
FIG. 13 is an enlarged cross-sectional view of FIG. 11.

There is shown in FIG. 13 an enlarged view of FIG. 11.

According to several embodiments of the present invention, the flow capacity of a main flow may be adjusted, as desired, by the adjusting number and/or size of apertures provided in a spool sleeve.

Figure 14:
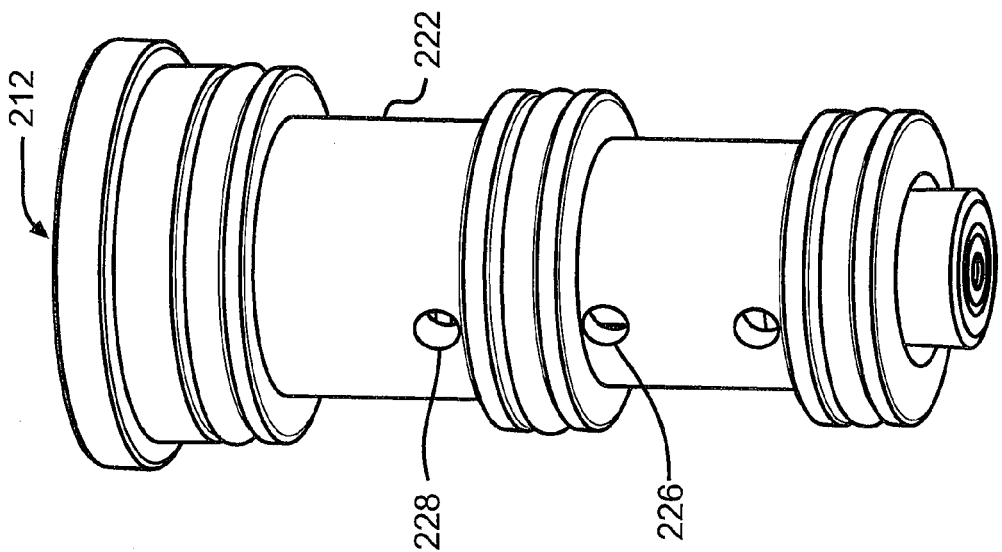
FIG. 14 is a perspective view of a main spool valve of a spool valve assembly according to a third embodiment of the present invention showing the main spool valve having two main input ports and two main output ports.

There is shown in FIG. 14 a main spool valve 212 according to a third embodiment of the present invention having a sleeve 222 including two main input ports 226 (one shown) and two main output ports (one shown). Preferably, the apertures form the main input ports 226 and the main output ports 228 are 1.0 mm diameter, although the apertures may be any desired diameter.

Figure 15:
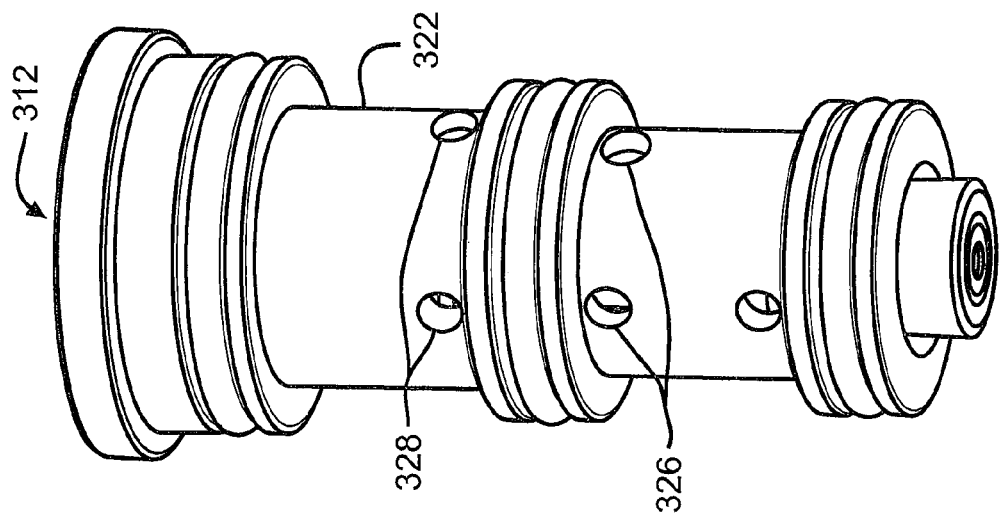
FIG. 15 is a perspective view of a main spool valve of a spool valve assembly according to a fourth embodiment of the present invention showing the main spool valve having four main input ports and four main output ports.

There is shown in FIG. 15 a main spool valve 312 according to a fourth embodiment of the present invention having a sleeve 322 including four main input ports 326 (two shown) and four main output ports (two shown). Preferably, the apertures form the main input ports 326 and the main output ports 328 are 1.0 mm diameter, although the apertures may be any desired diameter.

Figure 16:
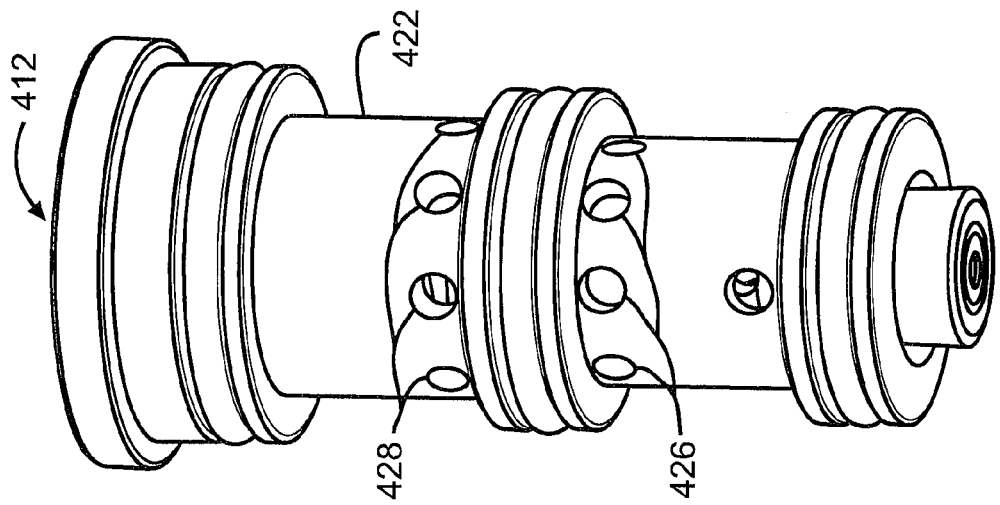
FIG. 16 is a perspective view of a main spool valve of a spool valve assembly according to a fifth embodiment of the present invention showing the main spool valve having eight main input ports and eight main output ports.

There is shown in FIG. 16 a main spool valve 412 according to a fifth embodiment of the present invention having a sleeve 422 including eight main input ports 426 (four shown) and eight main output ports (four shown). Preferably, the apertures form the main input ports 426 and the main output ports 428 are 1.0 mm diameter, although the apertures may be any desired diameter.

Figure 17:
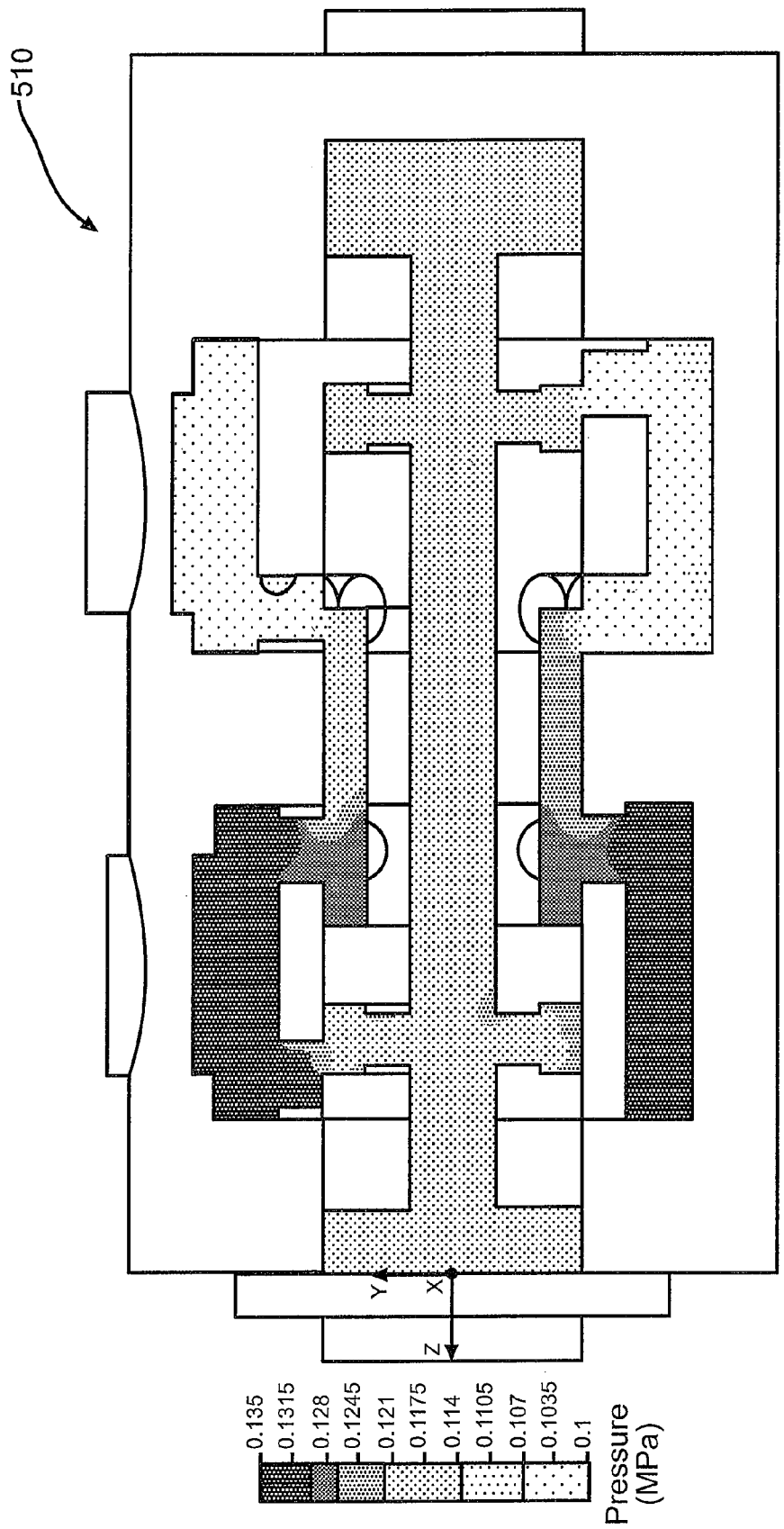
FIG. 17 is a cross-sectional schematic view of a spool valve assembly according to a sixth embodiment of the present invention illustrating the fluid pressures in an intermediate position.

There is shown in FIG. 17-19 a spool valve assembly 510 according to a sixth embodiment of the present invention illustrating the fluid pressures in an intermediate position.

Figure 20:
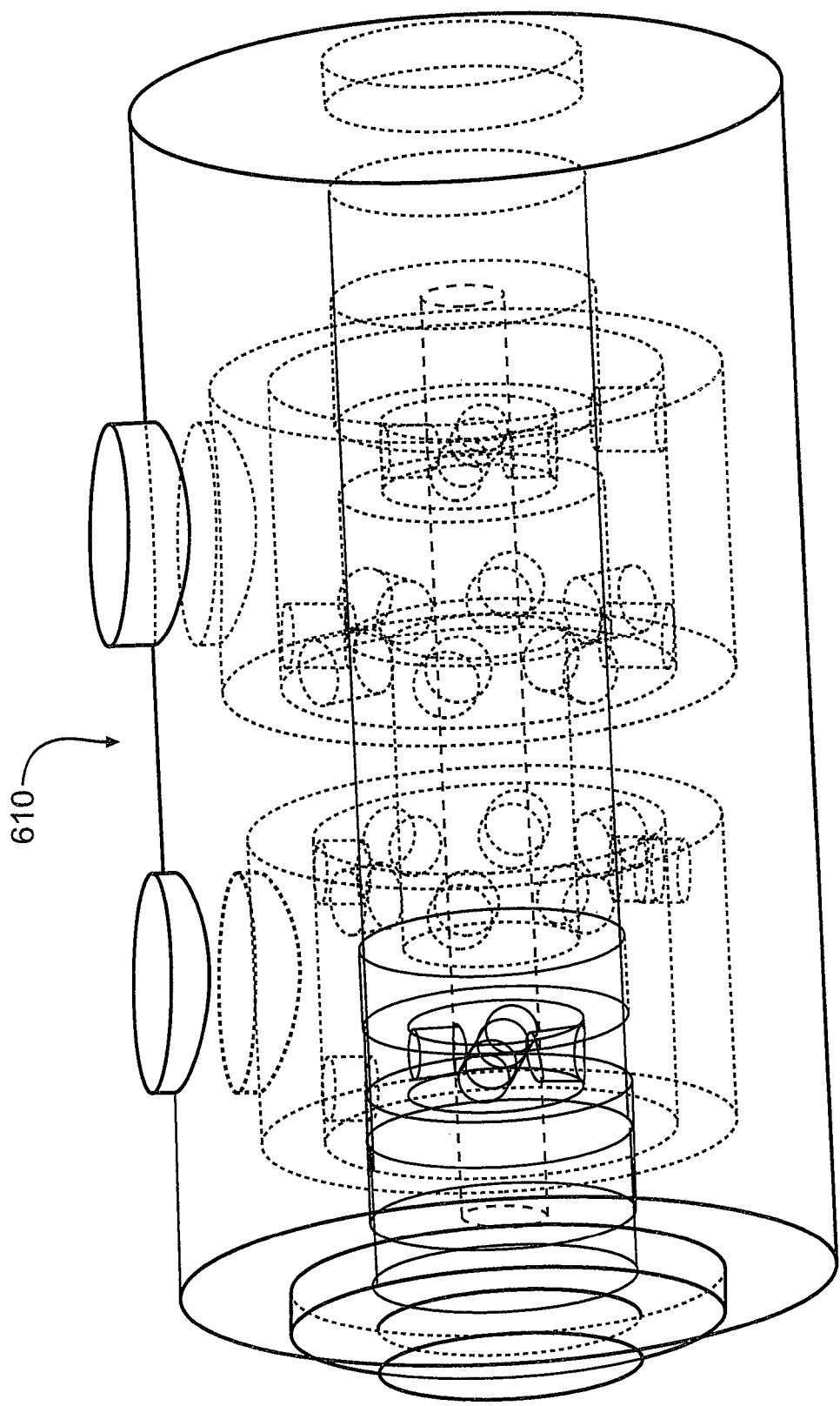
FIG. 20 is a semi-transparent perspective schematic view of a spool valve assembly according to a seventh embodiment of the present invention.

There is shown in FIG. 20 a spool valve assembly 610 according to a seventh embodiment of the present invention.

Figure 21:
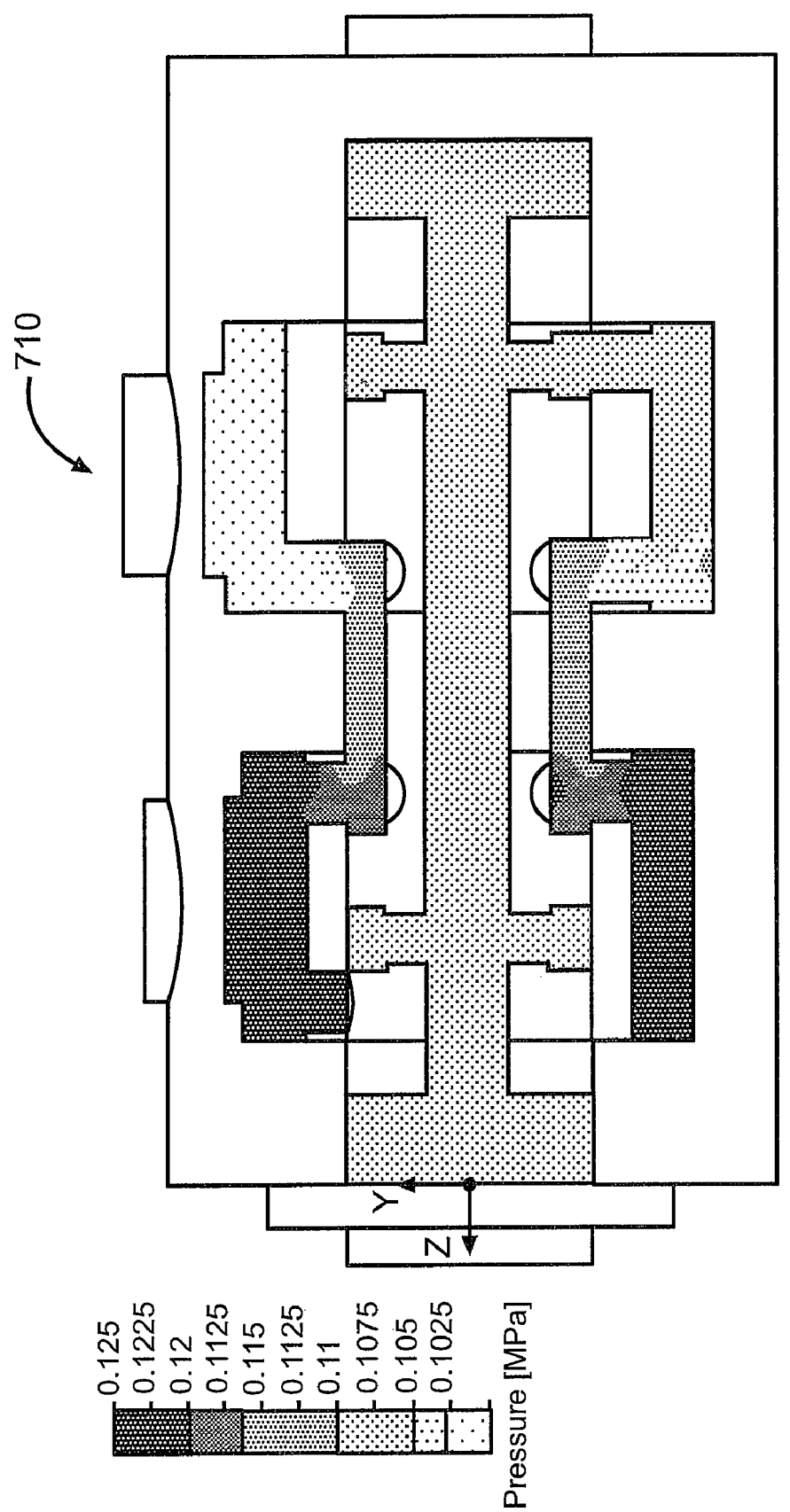
FIG. 21 is a cross-sectional schematic view of a spool valve assembly according to an eighth embodiment of the present invention illustrating the fluid pressures in an fully open position
Figure 22:
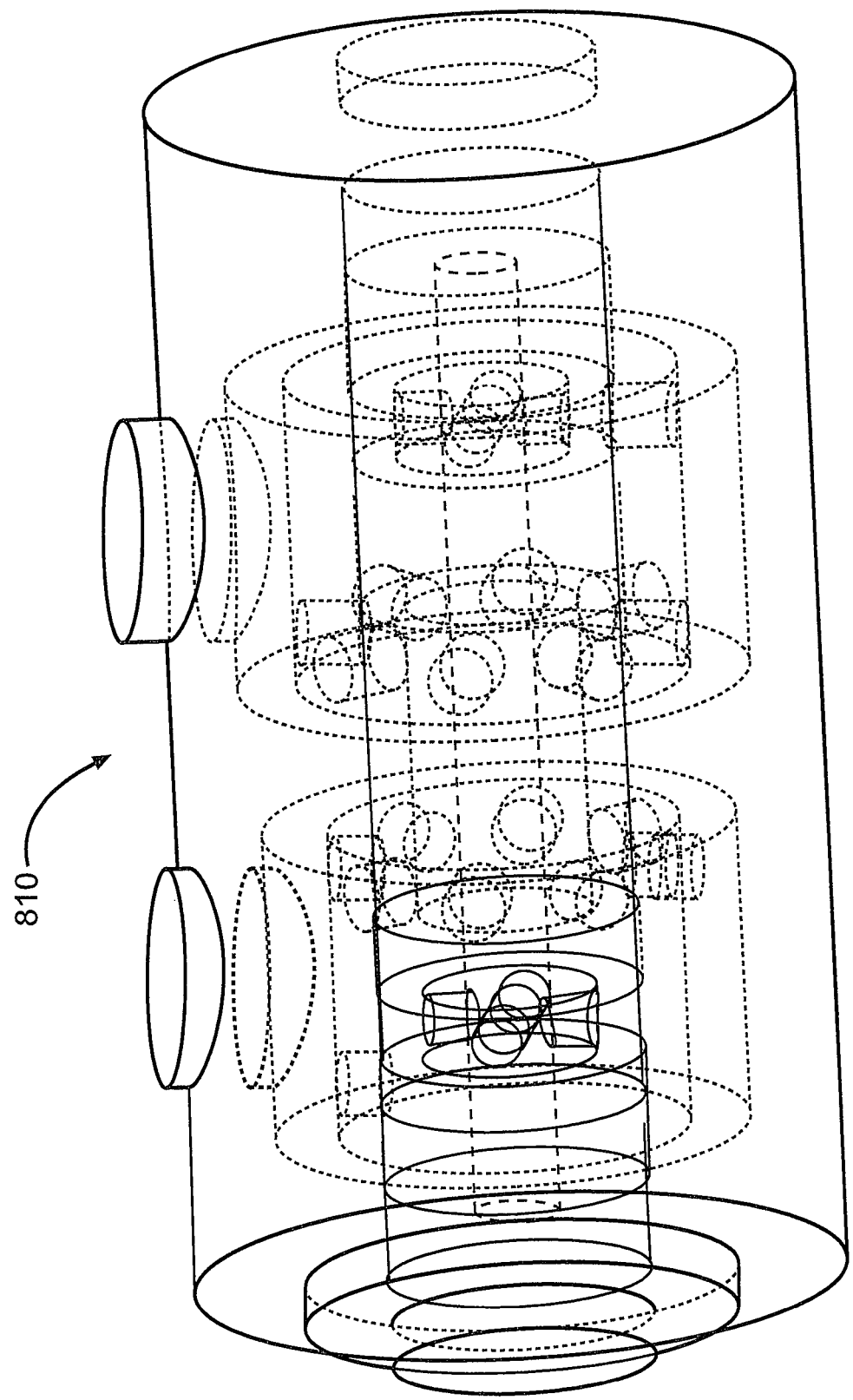
FIG. 22 is a semi-transparent perspective schematic view of a spool valve assembly according to a ninth embodiment of the present invention.

There is shown in FIG. 21 a spool valve assembly 710 according to an eighth embodiment of the present invention illustrating the fluid pressures in an fully open position There is shown in FIG. 22 a spool valve assembly 810 according to a ninth embodiment of the present invention.

In one aspect of the present invention, a valve device includes control structure for controlling the size of a main flow opening. For example, in the illustrated cases of both normally open and normally closed spool valves, any disturbing force trying to change the size of one of the main flow orifices is countered by feed back.

Although, a valve assembly according to one embodiment of the present invention is made of a metal such as aluminum or stainless steel, it must be understood that the valve assembly may be made of ceramics or any material suitable for the application in which the valve is to be used.

The relationships between the cross-sectional port flow areas and the system pressure can be illustrated by the following mathematical equations 1 and 3.

$$P_2 = \frac{P_1 A_1^2}{(A_1^2 + A_2^2)} \quad \text{Equation 1}$$

where P2 is the pressure of the command volume C1 set by the pilot valve 14 (note that the pressure of the reference volume R1 will also be C1), P1 is the pressure of the fluid provided by a supply source through the primary input P1, A1 is the cross-sectional flow area of the pilot input port, and A2 is the cross-sectional area or the pilot output port.

The following Equation 2 is achieved by rearranging Equation 1.

$$\frac{A_2}{A_1} = \sqrt{\frac{P_1 - P_2}{P_2}} \quad \text{Equation 2}$$

Additionally, $$P_2 = \frac{P_1 A_3^2}{(A_3^2 + A_4^2)} \quad \text{Equation 3}$$

where A3 is the cross-sectional flow area of the reference input port 30, and A4 is the cross-sectional area of the reference output port 32.

The following Equation 4 is achieved by rearranging Equation 3.

$$\frac{A_4}{A_3} = \sqrt{\frac{P_1 - P_2}{P_2}} \quad \text{Equation 4}$$

Thus, $$\frac{A_2}{A_1} = \frac{A_4}{A_3} \quad \text{Equation 5}$$

Showing that the ratio of the cross-sectional flow areas of the pilot input port and the pilot output port is equal to the ratio of the cross-sectional flow areas of the reference input port 30 and the reference output port 32.

While the principle and mode of operation of this invention have been explained and illustrated with regards to particular embodiments, it must, however, be understood that this invention may be practiced otherwise than as specifically explained and illustrated without departing from its spirit or scope.

What is claimed is:

1. A spool valve assembly for controlling fluid flow comprising:
    a body defining:
        a chamber having first and second ends
        a spool input port for fluid communication into the chamber;
        a spool output port for fluid communication out of the chamber;
        a reference inlet port for fluid communication into the chamber and
        a reference outlet port for fluid communication out of the chamber; and
    a spool having first and second ends disposed in the chamber for sliding movement between a first position which allows fluid flow from the spool input port to the spool output port and a second position which restricts fluid flow from the spool input port to the spool output port, the spool being positioned by differential pressure across the spool between a first volume of fluid, at a command pressure, disposed between the first spool end and the first end of the chamber and a second volume of fluid, at a reference pressure, disposed between the second spool end and the second end of the chamber, the reference inlet port and the reference outlet port both being in selective fluid communication with the second volume of fluid, one of the reference inlet port and the reference outlet port having a first flow capacity when the spool is in the first position and the one of the reference inlet port and the reference outlet port having a second flow capacity when the spool is in the second position, such that the reference pressure is changed by changing the position of the spool.

2. The spool valve assembly of claim 1 wherein the body includes a spool valve sleeve, supporting the spool.

3. The spool valve assembly of claim 1, further comprising:
    a command port adapted to receive a command pressure signal;
    the reference inlet port being adapted to be connected to a source of fluid at a first pressure;
    the reference outlet port being adapted to be connected to a region of fluid at a second pressure, less than the first pressure; and
    the first end of the spool cooperating with the body to define the first volume of fluid to have a variable size between the first end of the spool and the first end of the chamber, the first volume being in continuous fluid communication with the command port,
    the second end of the spool cooperating with the body to define the second volume of fluid to have a variable size between the second end of the spool and the second end of the chamber, the spool being movable between the first position, adjacent the first end of the chamber, and the second position, adjacent the second end of the chamber while substantially preventing fluid leakage through the chamber between the first volume of fluid and the second volume of fluid, the spool permitting fluid communication between the spool input port and the spool output port when the spool is in the first position, the spool blocking fluid communication between the spool input port and the spool output port when the spool is in the second position, the spool progressively decreasing fluid communication between the reference outlet port and the first volume of fluid and progressively increasing fluid communication between the reference inlet port and the first volume of fluid as the spool is moved from the first position thereof toward the second position thereof to cause pressure to rise in the second volume of fluid as the spool is moved from the first position toward the second position thereof, the spool being moved by a difference in pressures between the first volume of fluid and the second volume of fluid.

4. The spool valve assembly of claim 3, further comprising a pilot microvalve which is selectively actuated to send a pressure command to the first volume of fluid, wherein a cross-sectional flow area of a port of the spool valve changes in proportion to the actuation of the pilot microvalve.

5. The spool valve assembly of claim 3, wherein the body comprises:
    a valve housing; and
    a sleeve disposed in the valve housing, within the chamber, the spool input port and the spool output port being formed in the sleeve.

6. The spool valve assembly of claim 1, further comprising a pilot microvalve which is selectively actuated to send a pressure command to the first volume of fluid, wherein a cross-sectional flow area of a port of the spool valve changes in proportion to the actuation of the pilot microvalve.

7. The spool valve assembly of claim 6, further comprising a longitudinal fluid bore defined in the spool, the bore providing fluid communication a location in a fluid flow path between the reference inlet port and the reference outlet port to provide the selective fluid communication between the reference inlet port and the second volume, and to provide the selective fluid communication between the reference outlet port and the second volume, such that the reference pressure in the second volume changes in response to changes in the position of the spool.

8. The spool valve assembly of claim 7, further comprising:
   a first region of the spool, intermediate the first end and the second end of the spool, that cooperates with the spool input port and the spool output port to varying fluid flow between the spool input port and the spool output port; and
   a groove formed in an outer surface of the spool at a location between the first region of the spool and the first end of the spool, the groove being in fluid communication with the longitudinal fluid bore.

9. The spool valve assembly of claim 8, wherein the pilot valve is a microvalve.

10. The spool valve assembly of claim 6, wherein the pilot valve is an open center 3-way valve.

11. The spool valve assembly of claim 10, further comprising a longitudinal fluid bore defined in the spool, the bore providing fluid communication a location in a fluid flow path between the reference inlet port and the reference outlet port to provide the selective fluid communication between the reference inlet port and the second volume, and to provide the selective fluid communication between the reference outlet port and the second volume, such that the reference pressure in the second volume changes in response to changes in the position of the spool.

12. The spool valve assembly of claim 11, further comprising:
   a first region of the spool, intermediate the first end and the second end of the spool, that cooperates with the spool input port and the spool output port to varying fluid flow between the spool input port and the spool output port; and
   a groove formed in an outer surface of the spool at a location between the first region of the spool and the first end of the spool, the groove being in fluid communication with the longitudinal fluid bore.

13. The spool valve assembly of claim 12, wherein the pilot valve is a microvalve.

14. The spool valve assembly of claim 1, further comprising:
   a pilot valve having:
      a pilot input port; and
      a pilot output port, at least one of the cross-sectional flow area through the pilot input port and the cross-sectional flow area through the pilot output port being varied as the pilot valve is operated,
   the spool cooperating with the body to define a fluid passageway from the spool input port to the spool output port,
   at least one of the cross-sectional flow area through the spool input port and the cross-sectional flow area through the spool output port being varied as the spool moves,
   the command pressure in the first volume of fluid being controlled by the pilot valve,
   the spool moving in response to changing command pressures from the pilot valve such that a ratio of the cross-sectional flow area of the spool input port to the spool output port is maintained substantially equal to a ratio of the cross-sectional flow area of the pilot input port to the pilot output port.

15. The spool valve assembly of claim 14, the spool valve further comprising:
   the spool input port being adapted to be connected to a source of fluid at a first pressure,
   the spool output port being adapted to be connected to a region of fluid at a second pressure, less than the first pressure; and
   the spool being movable between a first position adjacent the first end of the chamber and a second position adjacent the second end of the chamber while substantially preventing fluid leakage through the chamber between the first volume at the command pressure and the second volume at the reference pressure, the spool permitting fluid communication between the spool input port and the spool output port when the spool is in the first position, the spool blocking fluid communication between the spool input port and the spool output port when the spool is in the second position, the spool progressively decreasing fluid communication between the reference outlet port and the second volume at the reference pressure and progressively increasing fluid communication between the reference inlet port and the second volume at the reference pressure as the spool is moved from the first position thereof toward the second position thereof to cause pressure to rise in the reference volume as the spool is moved from the first position toward the second position thereof, the spool progressively increasing fluid communication between the reference outlet port and the second volume at the reference pressure and progressively decreasing fluid communication between the reference inlet port and the second volume at the reference pressure as the spool is moved from the second position thereof toward the first position thereof to cause pressure to fall in the reference volume as the spool is moved from the second position toward the first position thereof, the spool being moved by a difference in pressures between the first volume at the command pressure and the second volume at the reference pressure.

16. The spool valve assembly of claim 15, wherein the spool is movable to simultaneously modulate flow from the spool input port to the spool output port and modulate flow between the reference inlet port and the reference outlet port.

17. The spool valve assembly of claim 14, wherein the pilot valve is a microvalve.

18. The spool valve assembly of claim 14, wherein the body comprises:
   a valve housing; and
   a sleeve disposed in the valve housing, within the chamber, the spool input port and the spool output port being formed in the sleeve.

19. The spool valve assembly of claim 14, wherein the pilot valve is an open center 3-way valve.

20. The spool valve assembly of claim 14, further comprising a longitudinal fluid bore defined in the spool, the bore providing fluid communication a location in a fluid flow path between the reference inlet port and the reference outlet port to provide the selective fluid communication between the reference inlet port and the second volume, and to provide the selective fluid communication between the reference outlet port and the second volume, such that the reference pressure in the second volume changes in response to changes in the position of the spool.

21. The spool valve assembly of claim 20, further comprising:
   a first region of the spool, intermediate the first end and the second end of the spool, that cooperates with the spool input port and the spool output port to varying fluid flow between the spool input port and the spool output port; and
   a groove formed in an outer surface of the spool at a location between the first region of the spool and the first end of the spool, the groove being in fluid communication with the longitudinal fluid bore.

22. The spool valve assembly of claim 21, wherein the pilot valve is a microvalve.

23. The spool valve assembly of claim 1, wherein the body comprises:
   a valve housing; and
   a sleeve disposed in the valve housing, within the chamber, the spool input port and the spool output port being formed in the sleeve.

24. The spool valve assembly of claim 1, wherein the spool is movable to simultaneously modulate flow from the spool input port to the spool output port and modulate flow between the reference inlet port and the reference outlet port.

25. The spool valve assembly of claim 24, further comprising a longitudinal fluid bore defined in the spool, the bore providing fluid communication a location in a fluid flow path between the reference inlet port and the reference outlet port to provide the selective fluid communication between the reference inlet port and the second volume, and to provide the selective fluid communication between the reference outlet port and the second volume, such that the reference pressure in the second volume changes in response to changes in the position of the spool.

26. The spool valve assembly of claim 25, further comprising:
   a first region of the spool, intermediate the first end and the second end of the spool, that cooperates with the spool input port and the spool output port to varying fluid flow between the spool input port and the spool output port; and
   a groove formed in an outer surface of the spool at a location between the first region of the spool and the first end of the spool, the groove being in fluid communication with the longitudinal fluid bore.

27. The spool valve assembly of claim 26, wherein the pilot valve is a microvalve.

28. The spool valve assembly of claim 1, further comprising a longitudinal fluid bore defined in the spool, the bore providing fluid communication a location in a fluid flow path between the reference inlet port and the reference outlet port to provide the selective fluid communication between the reference inlet port and the second volume, and to provide the selective fluid communication between the reference outlet port and the second volume, such that the reference pressure in the second volume changes in response to changes in the position of the spool.

29. The spool valve assembly of claim 17, further comprising:
   a first region of the spool, intermediate the first end and the second end of the spool, that cooperates with the spool input port and the spool output port to varying fluid flow between the spool input port and the spool output port; and
   a groove formed in an outer surface of the spool at a location between the first region of the spool and the first end of the spool, the groove being in fluid communication with the longitudinal fluid bore.

30. The spool valve assembly of claim 29, wherein the groove extends circumferentially about the spool.

* * * * *

UNITED STATES PATENT AND TRADEMARK OFFICE
CERTIFICATE OF CORRECTION

PATENT NO. : 8,387,659 B2
APPLICATION NO. : 12/593701
DATED : March 5, 2013
INVENTOR(S) : Harry A. Hunnicutt It is certified that error appears in the above-identified patent and that said Letters Patent is hereby corrected as shown below:

In the Claims

Column 12, Line 24, Claim 29, after claim delete "17" and insert -- 28 --.

Signed and Sealed this
Eleventh Day of June, 2013

Teresa Stanek Rea
*Acting Director of the United States Patent and Trademark Office*